United States Patent [19]
Anthamatten

[11] 3,785,219
[45] Jan. 15, 1974

[54] COASTER BRAKE SYSTEM FOR A MULTI-SPEED BICYCLE

[76] Inventor: Joseph L. Anthamatten, Precious Blood Seminary, Ruth Ewing Rd., Liberty, Mo. 64068

[22] Filed: June 5, 1972

[21] Appl. No.: 259,568

[52] U.S. Cl. .................................................. 74/217 B
[51] Int. Cl. ............................................. F16h 11/04
[58] Field of Search ................ 74/217 B, 242.11 B, 74/242.15 B

[56] References Cited
UNITED STATES PATENTS

| | | |
|---|---|---|
| 3,448,628 | 6/1969 | Shimano et al. ............... 74/217 B |
| 3,613,466 | 10/1971 | Houghton .......................... 74/217 B |

FOREIGN PATENTS OR APPLICATIONS

| | | |
|---|---|---|
| 737,864 | 12/1932 | France ............................. 74/217 B |

Primary Examiner—Leonard H. Gerin
Attorney—Claude A. Fishburn et al.

[57] ABSTRACT

A mechanism for maintaining tension in the drive chain on a multi-speed bicycle having an exposed drive ratio change device with a plurality of different sized rear sprockets and front sprockets and having a coaster brake actuated by reverse rotation of the front sprockets.

8 Claims, 5 Drawing Figures

PATENTED JAN 15 1974

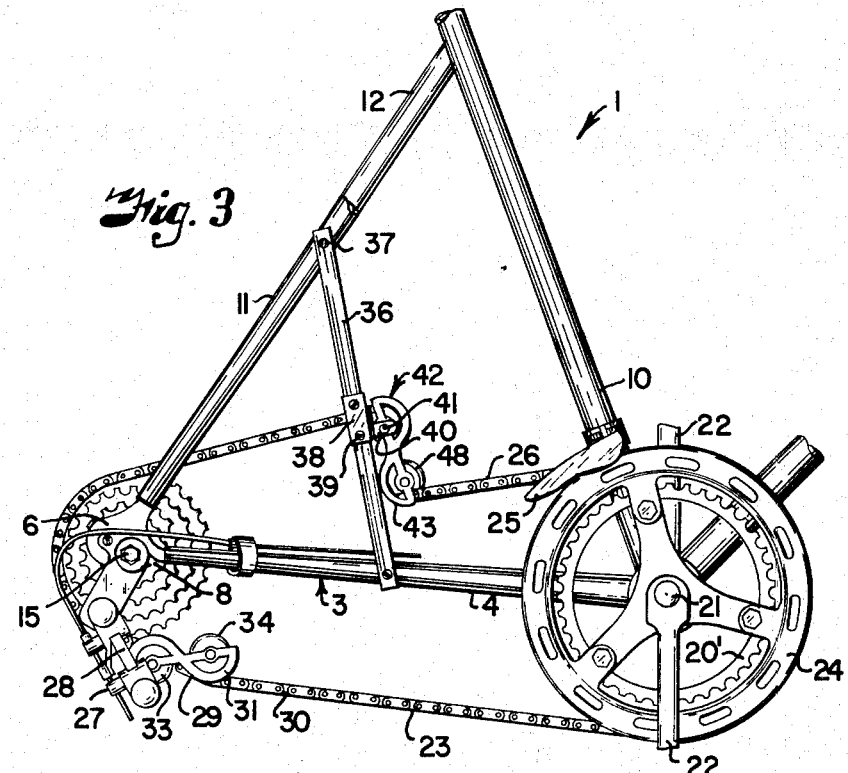
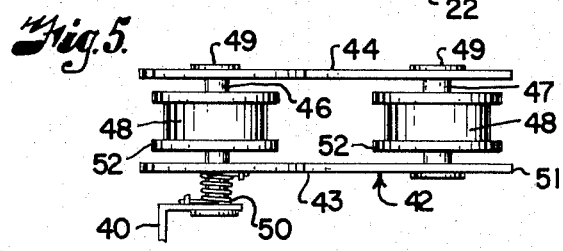
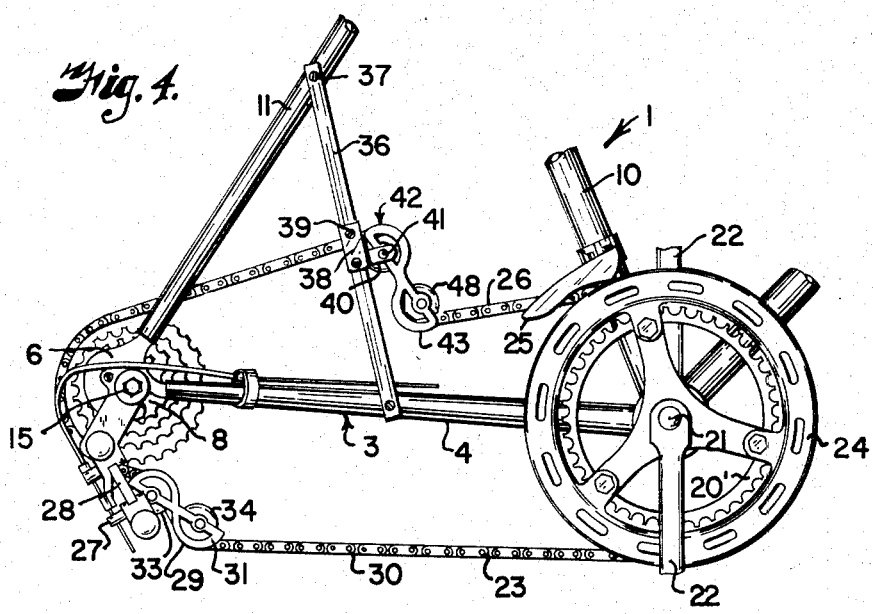

COASTER BRAKE SYSTEM FOR A MULTI-SPEED BICYCLE

The conventional multi-speed bicycle having an exposed speed change device uses a caliper type brake system wherein the brakes are applied to the rear tire or rim to effect braking of the bicycle. Attempts have been made to use a coaster brake in the rear hub but difficulties have been experienced because of slack in the upper run of the chain and in chain take up devices heretofore used particularly when the bicycle is being operated in one of the high speed positions. These difficulties typically include failure of proper braking, disengagement of the chain from the sprockets with the resulting dangers therefrom.

The principal objects of this invention are: to provide and improved tensioning mechanism to maintain tension in the upper run of the drive chain of the bicycle eliminating slack therein; to provide such a mechanism to prevent the drive chain from changing sprockets or disengaging sprockets when the drive sprockets are rotated in reverse to actuate the coaster brake; to provide a tensioning mechanism that is positive and smooth in operation; to provide a tensioning mechanism that is easy to install and maintain; and to provide a tensioning mechanism that is simple and inexpensive to manufacture.

Other objects and advantages of this invention will become apparent from the following description taken in connection with the accompanying drawings wherein are set forth by way of illustration and example certain embodiments of this invention.

FIG. 3 is a side view of the tensioning mechanism and multi-speed drive assembly with the chain tensioned in the position actuating the coaster brake.

FIG. 4 is a side view of the tensioning mechanism and multi-speed drive assembly with the drive sprocket and pedals stationary or in a neutral position allowing the bicycle to coast or remain stationary.

Figure 1:
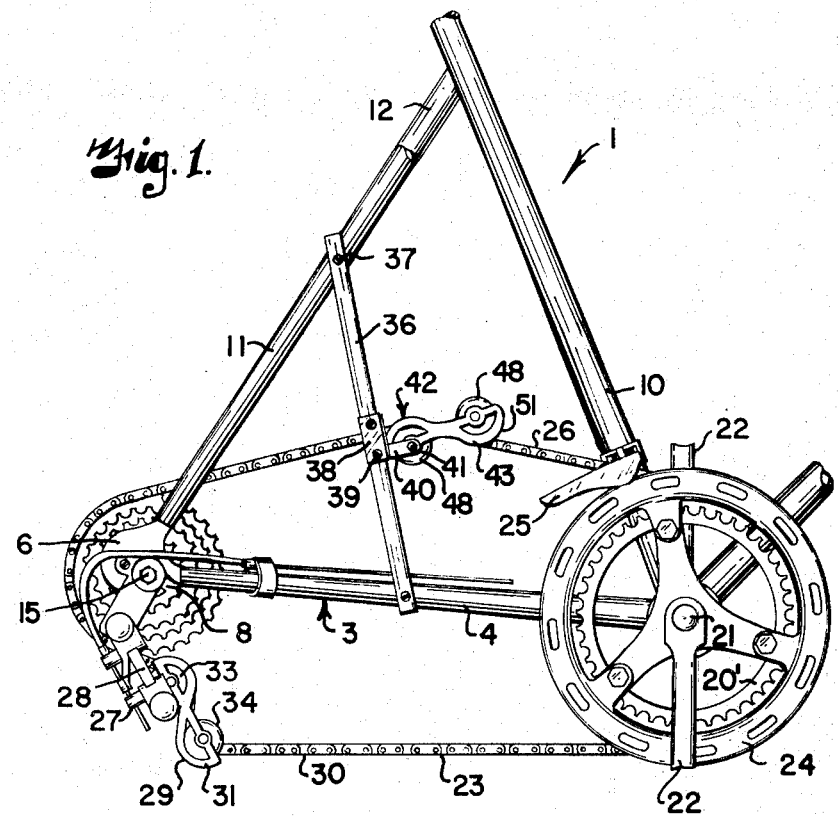
FIG. 1 is a side view of the tensioning mechanism in multi-speed drive assembly with the drive chain running in the direction required to move the bicycle forward.
Figure 2:
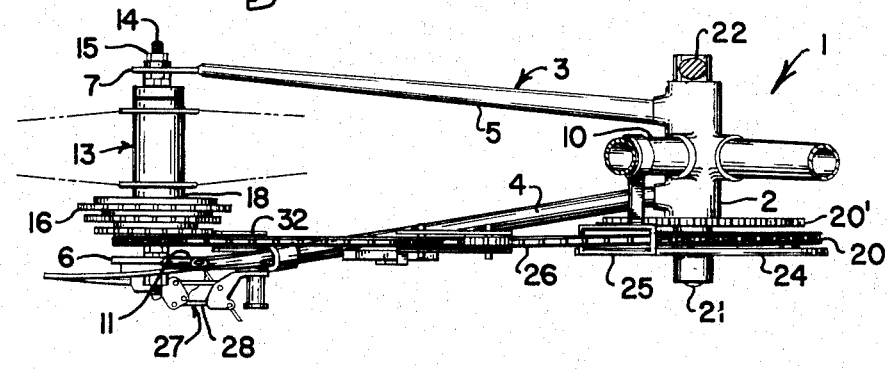
FIG. 2 is a plan view of the tensioning mechanism and multi-speed drive assembly.

FIG. 5 is an enlarged view of the tensioning mechanism and torque spring. the chain As required, detailed embodiments of the present invention are disclosed herein, however, it is to be understood that these embodiments are merely exemplary of the invention which may be embodied in forms varying from the illustrated embodiments presented herewith. Therefore, specific structural and functional details disclosed herein are not to be interpreted as limiting, but merely as a basis for the claims actually defining the scope of this invenition.

The reference numeral 1 designates generally a bicycle frame which may be of generally conventional form and includes a drive sprocket mounting member 2 and an elongate substantially horizontal U-shaped member 3 extending rearwardly therefrom. The U-shaped member 3 has two laterally spaced arms or members 4 and 5 with flat portions 6 and 7 respectively in spaced parallel planes on the free ends thereof for suitably mounting a rear axle assembly. In the illustrated structure, the flat portion 6 has an elongate substantially horizontal slot 8 and the flat portion 7 has a similar slot (not shown) extending forward. A bicycle frame member 10 is secured to the sprocket mounting member 2 and extends generally upwardly therefrom at an acute angle to the U-shaped member 3. Bicycle frame members 11 and 12 are each secured to the flat portions 6 and 7 respectively and extend generally upwardly therefrom disposed at an acute angle to the U-shaped member 3. The frame members 11 and 12 have upper ends secured to the upper end of the frame member 10 thereby forming a rigid triangular shaped rear bicycle frame portion.

A rear hub assembly 13 is rotatably mounted between the flat portions 6 and 7 wherein a rear axle or shaft 14 of the rear hub assembly 13 is secured in the elongate slots 8 and 9 by suitable fasteners 15 such as hex nuts. The rear hub assembly 13 includes a plurality of rear sprockets 16, preferably five in number, operatively connected to a wheel hub 18 in such a manner that forward rotation of the rear sprockets 16 will effect forward rotation of the wheel hub 18, and reverse rotation of the rear sprockets 16 will actuate a coaster brake (not shown) contained in the wheel hub 18. The rear sprockets 16 are spaced apart relative to one another and are each of a different diameter. The sprockets may be progressive in size from either side, however, in the illustrated structure, the outer most exposed sprocket is the smallest. Each inner sprocket from the smallest sprocket is successively larger than the immediately adjacent outer sprocket.

A front drive sprocket assembly includes a plurality of drive sprockets 20 and 20', preferably two in number, secured to a sprocket shaft 21 rotatably supported in suitable bearings in the mounting member 2 whereby the drive sprockets are rotatably mounted on the bicycle frame 1. Pedal cranks 22 are secured to the sprocket shaft 21, one said crank being secured to the free end extending through the drive sprockets mounting member 2 on the side of the mounting member 2 opposite the drive sprockets and the other pedal crank 22 being secured to the shaft 21 and being outwardly disposed of the outer one of the drive sprockets 20 and 20'. This structure and mounting of the front drive sprocket assembly maybe a conventional form for multi-speed bicycles. The drive sprockets 20 and 20' are of different diameters, the largest sprocket 20 preferably being disposed outer most of the frame, as later described.

The sprockets 20 and 20' are operatively connected to the rear sprocket 16 by a drive chain 23 that engages selected rear sprockets and drive sprockets whereby rotation of the front drive sprockets 20 and 20' will effect rotation of the rear sprockets in the same direction.

A chain guard 24 is mounted on the outer most disposed drive sprocket 20 and extends radially outwardly of the drive sprockets 20 and 20' preventing objects such as an operator's pant leg from becoming entangled with the chain and one of the drive sprockets 20 or 20'. By having the larger drive sprocket 20 disposed outermost tends to prevent the chain from disengaging the drive sprockets 20 and 20' during shifting of the chain from one drive sprocket to another and assures proper movement of the chain. The chain guard 24 also helps to prevent the drive chain 23 from disengaging the outer-most drive sprocket during the shifting of the chain 23 by acting as a barrier or stop to the chain.

A shifting lever 25 is mounted on the frame member 10 adjacent to the drive sprocket 20 and engages the upper run 26 of the drive chain 23. The shifting lever 25 selectively changes or shifts the drive chain 23 from one drive sprocket 20 to the adjacent sprocket 20' or return as in a conventional multi-speed bicycle structure thereby changing the speed ratio of the bicycle.

Reference numeral 27 designates generally a rear shifting mechanism mounted on the flat portion 6 of the bicycle frame and is positioned adjacent to the rear hub assembly 13. The rear shifting mechanism 27 includes a lever arm 28 secured to the flat portion 6. Means secure a lower run tensioning means 29 in pivotal relation to the lever arm 28. The lower run tensioning means preferably includes a pair of spaced apart elongate arms 31 and 32 having spaced apart chain engaging portions or wheels 33 and 34 rotatably mounted therebetween. The lower run passes over a portion of the wheel 33 then between the wheels 33 and 34 and then over an opposed portion of the wheel 34 whereby the chain is in an S-path. Torque means or a coil spring (not shown) having end portions in respective engagement with the lever arm 28 and the elongate arm 31 urging the lower run tensioning means to swing or pivot about the pivotal mounting to maintain tension in the lower run 30 during forward rotation of the front drive sprocket assembly 19. Tension is maintained in the lower run 30 preventing the drive chain 23 from becoming disengaged from the rear sprockets and/or the front sprockets during shifting and forward rotation of the front drive sprocket assembly 19.

An elongate bracket 36 extends between and is secured to the outer sides of the arm member 4 and the frame member 11 by suitable fastening devices 37. A bracket portion 38 is secured to the outer side of the support structure by fastening devices 39. The bracket portion 38 includes a member 40 extending inwardly from the elongate bracket 36 with a portion thereof being substantially parallel to the upper run of the drive chain and the member 40 has an aperture 41 therethrough wherein an upper run tensioning means 42 is pivotally mounted on the member 40 in a manner later described.

The tensioning means includes two elongate arms 43 and 44. The elongate arms 43 and 44 each preferably have two bores (not shown) therethrough normal to the faces or surface of the elongate arm 43 and 44, the bores through the arm 43 being in substantial alignment with a respective bore through the arm 44. Shafts 46 and 47 each extend through a respective set of bores of each of the side plates 43 and 44 and a axial bore through a respective chain engaging portion or wheel 48 whereby the wheels 48 are rotatably mounted on a respective shaft 46 or 47. The wheels 46 are positioned between the elongate arms 43 and 44 whereby the elongate arms confine the chain engaging portions or wheels 48 between same.

The shaft 46 also extends through the aperture 41 with sufficient clearance therebetween to permit the tensioning means 42 to pivot about the shaft 46, the aperture may also include bearing means (not shown). The free ends of the shafts 46 and 47 have means 49 thereon securing the wheels and elongate arms together and to the member 40.

The wheels 48 are spaced apart and have opposed peripheral portions, the chain upper run 26 passes over one opposed portion, between the wheels and then over the other opposed portion in a general S-path. Torque means or a coil spring 50 is in engagement with the member 40 and the elongate arm 43 to urge the tensioning means to pivot or swing clockwise as view in FIG. 1 thereby taking up slack in the upper run 26 upon reverse rotation of the front drive sprocket assembly 19. Although various methods are available to do this, in the illustrated structure, a coil or torque spring 50 is mounted on the shaft 46 between the member 40 and the elongate arm 43. The coil spring 50 has free ends, one in engagement with the member 40 and one in engagement with the elongate arm 43 and applies torque to the tensioning means 42 about the shaft 46 urging the wheel 48 remote from the shaft 46 to engage and maintain tension in the upper run 26. Maintaining tension in the upper run 26 prevents the drive chain 23 from becoming disengaged from the front and rear sprockets and from changing sprockets unintentionally.

To prevent the upper run of the drive chain from disengaging the wheels 48, the elongate arms 43 and 44 have portions 51 extending radially outwardly of the wheels 48 a sufficient distance whereby if the chain becomes slackened the portions 51 will prevent the upper run 26 from disengaging the wheels 48. In addition to preventing disengagement of the upper run 26 from the wheels 48, the portions 51 also will tend to prevent objects from becoming entangled with or between the wheels 48 and the upper run 26 of the drive chain 23. Preferably, the wheels 48 have members or flange portions 52 extending radially outwardly of the peripheries of the wheels 48 in spaced relation defining an annular groove therebetween. The upper run 26 is received within the grooves and the flanges 52 limit relative lateral movement between the upper run 26 and the wheels 48.

The upper run tensioning means 42 and the lower run tensioning means 29 move in conjunction or cooperation to maintain tension in the drive chain 23 at all times. During forward rotation the lower run 30 would tend to slacken and the upper run 26 would tend to tighten, but the lower run tensioning means 42 pivots counterclockwise to allow the upper run 26 to become substantially straight. The opposite occurs during reverse rotation, the upper run tends to slacken and the lower run tends to tighten whereby the upper run tensioning means 42 pivots clockwise to maintain tension in the upper run and the lower run tensioning means 29 pivots counterclockwise to permit the lower run 30 to straighten. Directions of pivoting are as viewed in FIG. 1.

It is to be understood that while I have illustrated and described one form of my invention, it is not to be limited to the specific form or arrangement of parts herein described and shown except in so far as such limitations are included in the claims.

What I claim and desire to secure by Letters Patent is:

1. In a bicycle with a frame-supported rear hub including a coaster brake and an exposed speed change mechanism comprising a plurality of rear sprocket wheels of different numbers of teeth operatively connected to a frame-supported front driving sprocket by means of a driving chain having upper and lower runs, and a rear shifting mechanism adjacent the rear hub assembly and a lower run tensioning means including a pivotally mounted arm extending away from said hub assembly and torque means associated with said arm to swing the arm and maintain tension on the lower run of the chain, chain tensioning means characterized by and comprising means pivotally mounted on said bicycle frame adjacent to said upper run between the rear hub and the front drive sprocket member, said tensioning means including an elongate arm, means pivotally mounting said arm relative to said frame with said arm having a free end extending toward said driving sprocket, chain engaging portions on said arm free end and engaging said upper chain run, second torque means engaging said frame and effecting pivoting of said tensioning means arm to eliminate slack in the upper run upon reverse rotation of said front drive sprocket and said rear sprocket wheels actuating said coaster brake.

2. A multi-speed chain and sprocket drive for a bicycle as set forth in claim 1 wherein:
   a. said upper arm tensioning means having spaced chain engaging portions mounted on said arm;
   b. said chain engaging portions having generally circular peripheries and axes substantially normal to the plane of the chain.

3. A multi-speed chain and sprocket drive for a bicycle as set forth in Claim 2 including:
   a. means rotatably mounting said chain engaging portions on said elongate arm with axes of said portions parallel and spaced longitudinally of said arm, said upper run extending over opposed portions of the peripheries thereof and therebetween in a general S-path;
   b. the pivotal mounting of the upper run tensioning means arm being adjacent the axis of one of said chain engaging portions whereby said elongate arm and chain engaging portions swing generally in the plane of the chain path.

4. A multi-speed chain and sprocket drive for a bicycle as set forth in claim 3 wherein:
   a. said torque means being a resilient member having portions in relative engagement with the frame and elongate arm to urge the chain engaging portion remote from said pivotal mounting toward the chain and maintain tension therein;
   b. said chain engaging portions having rims extending radially outwardly of the peripheries thereof to limit relative lateral movement of the chain and chain engaging portions.

5. A multi-speed chain and sprocket drive for a bicycle as set forth in claim 4 wherein said chain lower run tensioning means includes:
   a. a second elongate arm having second chain engaging portions rotatably mounted thereon in spaced apart relation whereby said lower run extends over opposed portions of the chain engaging portions and therebetween in a general S-path;
   b. said second torque means being a resilient member and having end portions in relative engagement with the frame and the elongate arm to urge the second chain engaging portion remote from the respective pivotal mounting toward the chain maintaining tension therein, said torque means of the tensioning means for both upper and lower runs moving the respective tensioning means in relative cooperation to eliminate slack in the drive chain at all times.

6. A multi-speed chain and sprocket drive for a bicycle as set forth in claim 5 wherein:
   a. each of said elongate arms of the tensioning means having a free end remote from the respective pivotal mounting and extending generally toward the drive sprocket.

7. A multi-speed chain and sprocket drive for a bicycle as set forth in claim 4 wherein:
   a. said elongate arm having spaced parallel portions with the chain engaging portions therebetween;
   b. said parallel portions having flanges extending radially outwardly adjacent the peripheries of the chain engaging portion engaged by said upper run to resist disengagement of said upper run from the chain engaging portions.

8. In a bicycle with a frame supported rear hub including a coaster brake and an exposed speed change mechanism comprising a plurality of rear sprocket wheels of different numbers of teeth operatively connected to a frame supported front driving sprocket by a driving chain having upper and lower runs and a rear shifting mechanism adjacent said rear sprocket wheels including:
   a. a bicycle frame portion having spaced apart members extending and diverging forwardly from the rear hub, said upper run being disposed between said frame members and in a plane substantially parallel to the plane of said frame members;
   b. an elongate bracket member extending between said frame member and fixed thereto, said bracket member being adjacent said upper run;
   c. tensioning means including a pair of elongate arms in spaced apart relation, spaced chain engaging wheels between said arms and rotatably mounted thereon with said upper run extending over opposed portions of the wheels and therebetween in a general S-path, means adjacent one of said wheels pivotally mounting said tensioning means arms on said bracket for swinging movement substantially in the plane of the chain runs, said arms extending from said pivotal mounting means toward the front driving sprocket;
   d. a coil spring having end portions with one engaging said bracket and the other engaging one of said arms and operative to urge said tensioning means to pivot toward said upper run to maintain tension therein;
   e. a lower run tensioning means pivotally mounted on the rear shifting mechanism adjacent to said chain lower run and rear sprocket wheels, said lower run tensioning means including a second pair of elongate arms in spaced apart relation and having a free end extending away from the rear sprocket wheels, spaced chain engaging portions rotatably mounted between said elongate arms whereby said lower run extends over opposed portions of the chain engaging portions and therebetween in a general S-path;
   f. torque means having end portions in relative engagement with the rear shifting mechanism and one of said second pair elongate arms to urge the chain engaging portion remote from the respective pivotal mounting toward the chain lower run maintaining tension therein.

\* \* \* \* \*